United States Patent [19]

Flurry

[11] Patent Number: 4,633,436

[45] Date of Patent: Dec. 30, 1986

[54] REAL-TIME RUB-OUT ERASE FOR AN ELECTRONIC HANDWRITING FACILITY

[75] Inventor: Gregory A. Flurry, Austin, Tex.

[73] Assignee: International Business Machines Corp., Armonk, N.Y.

[21] Appl. No.: 562,389

[22] Filed: Dec. 16, 1983

[51] Int. Cl.⁴ .............................................. G06F 3/14
[52] U.S. Cl. ................................................... 364/900
[58] Field of Search ................. 178/18; 340/706, 707, 340/708, 709; 364/200 MS File, 900 MS File

[56] References Cited

U.S. PATENT DOCUMENTS

| | | | |
|---|---|---|---|
| 3,559,182 | 1/1971 | Floret et al. | 364/900 |
| 4,112,415 | 9/1978 | Hilbrink | 364/900 X |
| 4,197,590 | 4/1980 | Sukonick et al. | 364/900 |
| 4,317,956 | 3/1982 | Torok et al. | 178/18 |

*Primary Examiner*—Thomas M. Heckler
*Attorney, Agent, or Firm*—C. Lamont Whitham

[57] ABSTRACT

An electronic handwriting facility comprises a central processing unit (10), an all points addressable display (12), and an electronic tablet (14) and stylus (16). The handwriting facility simulates writing with a pen or pencil and paper. An electronic document is generated by periodically sending to the central processing unit (10) the absolute location of the stylus (16) in relation to the tablet (14). Each point is mapped to the display coordinate system, and the points are stored in point list. The handwriting facility is provided with a real-time rub-out erase feature wherein the handwriting facility is first set to the erase mode and then the points in the point list to be erased are identified. Real-time erasure is assured by using a grid overlaying the write area to limit the number of points searched to a small percentage of the total. The grid breaks the write area into a number of grid boxes. Only the grid boxes touched by the erase cursor are searched for erasure. When a point is inside the erase cursor, it is deleted from the point list. The user is provided with a menu from which to select an erase stylus size further adding to the flexibility of the erase feature.

8 Claims, 12 Drawing Figures

ELECTRONIC TABLET AND STYLUS

SEGMENTS FOR GRID BOX [i,j] : (45,46)
  "      "    "    "  [i,j] : (47,49)

CONTIGUOUS SEGMENTS FOR ERASE CURSOR LOCATION : (45,49)
PROPER      "        "    "      "      "    : (44,49)

REAL-TIME RUB-OUT ERASE FOR AN ELECTRONIC HANDWRITING FACILITY

DESCRIPTION

Technical Field

The subject invention generally relates to the provision of handwritten communication in an electronic office environment by simulating a pen or pencil and paper, and more particularly to an improvement in such an electronic handwriting facility that gives the user the same correction capability as a pencil with an eraser.

Background

In non-electronic office environments, handwritten notes (e.g. memos, reminders, telephone messages, and the like) are common because of the relative speed and convenience of handwriting. Even in an electronic environment, handwritten notes are still common. In fact, many users of electronic office systems think nothing of writing a memo with pen or pencil and paper rather than using a text editor to write the same memo. Unfortunately, in an electronic environment, these handwritten notes must be handled differently than electronic documents thereby leading to inefficiencies. An electronic handwriting facility has been developed that allows handwritten notes to be created and reviewed in an electronic environment and be considered as another type of electronic document. Thus, handwritten notes can be handled, i.e. mailed, archived, etc., the same as other electronic documents, improving efficiency and productivity.

The handwritting facility requires a certain minimum office system work station to support it. This work station is shown in FIG. 1 and includes a central processing unit (CPU) 10 with an appropriate operating system (OS) to support real-time response of the facility and a connection to the office system network, an all points addressable (APA) display 12 for displaying the arbitrary appearance of handwriting, and an "electronic tablet" 14 or digitizer or similar device which translates movements of a sylus or pen 16 into a stream of positional information that the CPU 10 can intrepret.

The office system user will in general be familiar with text editors and could consider the handwriting facility (HF) to be a handwriting or graphics editor. To capitalize on this familiarity, the HF can be invoked like a text editor; in other words, the user enters a command and selects a "document" to work on. The document created by the HF can have one or more "pages". One page documents might be used for short notes to others, telephone messages or the like, while a multi-page document might be used for a series of related notes, just like a paper notebook. The user can move to different document pages or scroll through one page just the same as with a text document. The OS is responsible for getting user commands and giving them to the HF. In general, the HF may be operated as one of several processes, each with its own "window" for user interaction on the display. The HF window may use only part of the total display area, so the OS would pass control to the HF whenever the user's sytlus moves into the window, and the HF recognizes when the user's stylus moves out of the HF window and then relinquish control to the OS.

When writing a note with pencil and paper, a user often wants to erase mistakes for a neater, more legible, or more understandable result. In the non-electronic office, an eraser on the end of the pencil facilitates the erasure. It is desirable to provide the HF with a similar capability. It is known to provide interactive graphic displays with an erase feature, but real-time operation is generally limited to those systems having either a limited or low resolution display. The HF most advantageously uses a high resolution display, and there is therefore a need for real-time erasure of such a display.

Electronic erase functions are known in the prior art. For example, L. Kool in an article entitled "The Scribphone: a graphic telecommunication system" published in the *Philips Telecommunication Review*, Vol. 38, No. 1, January 1980, pages 7 to 10, states that the Scribphone system is provided with "wipe-out" facilities. J. L. Bordewijk in an article entitled "Teleboard, Scribphone and their Relation to 'Coded Text Transmission'" published in the Conference Proceedings of Electronic Text Communication held in Munich, Germany, June 12 to 15, 1978, mentions distant-erasing and distant-correction facilities of the Teleboard system. However, neither of these articles describes an erase facility capable of real-time erasure for a high resolution display.

Somewhat similar to the Scriphone and Teleboard systems is the remote chalkboard system which is the subject of U.S. Pat. No. 4,317,956 to Torok et al. In this system, when information is being removed from the input surface, a graphical eraser appears at the remote screen at the site of the removed information. A different approach is taken by Sukonick et al in U.S. Pat. No. 4,197,590. The system described in this patent is a computer graphics system as contrasted with a handwriting facility. Sukonick et al employ an XOR feature that allows a selective erase that restores lines crossing or concurrent with erased lines. This XOR feature also permits part of the drawing to be moved or "dragged" into place without erasing other parts of the drawing.

SUMMARY OF THE INVENTION

It is therefore an object of the present invention to provide the user of an electronic handwriting facility with the same correction capability as an eraser provides for hand writing with a pencil and paper.

It is another object of the invention to provide a real-time rub-out eraser for an electronic handwriting facility.

The foregoing and other objects of the invention are accomplished by first setting the HF to erase mode and then identifying points from a point list to be erased. Real-time erasure is assured by using a "grid" over the write area to limit the number of points searched to a small percentage of the total. The grid breaks the write area into a number of grid boxes, the number and size of which depend on processing requirements. Only the grid boxes touched by the erase cursor are searched for erasure. When a point is inside the erase cursor, it is deleted from the point list. This point list is updated after the erasure as is the visual display of the tablet. An additional feature of the invention is that the user may select an erase stylus size to match the user needs. Selection of the stylus size is preferably accomplished from a menu display.

BRIEF DESCRIPTION OF THE DRAWINGS

The objects and other aspects and advantages of the invention will be better understood from the following detailed description of the invention with reference to the accompanying drawings, in which.

DETAILED DESCRIPTION OF A PREFERRED EMBODIMENT OF THE INVENTION

Figure 2:
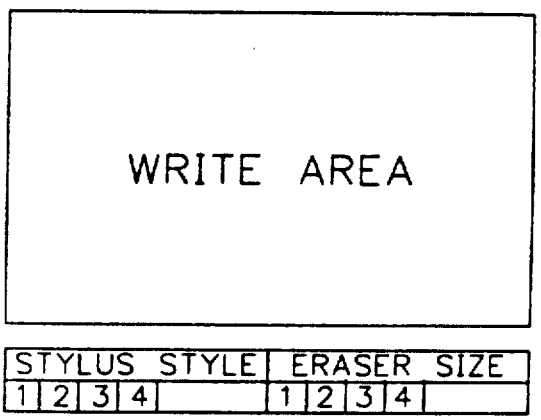
FIG. 2 is a diagram of the menu display showing the handwriting facility window and selection menus for both stylus style and eraser size.

The terms "real-time" and "rub-out" imply that the electronic handwriting facility (HF) eraser works just like the eraser on the end of a pencil; that is, the user "rubs" the area he or she wants to erase and the writing in that area disappears. A user may want to precisely erase a small area or erase a large area quickly. With a pencil, the eraser size is constant. In contrast, the electronic HF eraser size can be chosen to suit the user's current needs. To provide multiple eraser sizes, the HF menu shown in FIG. 2 contains choices for the various sizes. A user can write by choosing one of the stylus styles, for example line width and/or color, in which case the HF presents a "write" cursor indicating the HF is in the "write mode". Similarly, a user can erase by choosing one of the eraser sizes, in which case the HF then presents an appropriately sized "erase" cursor.

Figure 1:
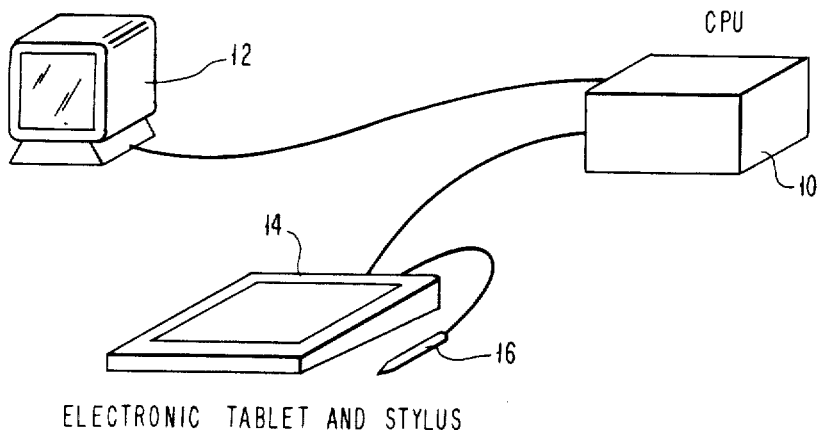
FIG. 1 is a block diagram showing the basic hardware components of the handwriting facility.

More particularly, the HF shown in FIG. 1 is based on two assumptions: First, it is assumed that the electronic tablet 14 can sample a user's hand movements fast enough and with enough resolution to provide points to the CPU 10 that can be connected with straight lines and result in an adequate representation of handwriting on paper, and second it is assumed that the CPU display controller is capable of drawing straight lines between two point fast enough and with enough resolution to result in an adequate representation of handwriting on the display 12. Both assumptions can be met by commercially available hardware. The electronic tablet 14 periodically sends the CPU 10 the absolute location of the stylus 16 in relation to the tablet surface. The CPU 10 maps each point to the display coordinate system and makes it available to the HF. The HF moves a "cursor" on the display to the point so the user knows the relationship of the stylus 16 to the display 12 and to the electronic page on which he or she is writing. These may be different because of the use of a window system for multitasking, scrolling of the page, or both. The HF maps the point to the page coordinate system for further use in the HF.

When the user writes, the handwriting facility stores the points from the tablet as well as displays them. Since the HF works on only one page at a time, a simple structure serves well. The "point list" contains two fields, a point count and a sequential list of the points recorded for the page. Handwriting is really a collection of "strokes". A stroke is the series of points from the first point where the stylus goes down to the first point where the stylus comes up. Since the user may move the stylus between strokes, e.g. between words, stroke starting points are identified in the point list. Since strokes may be of any style allowed, style information is also stored. For the start of a stroke and X and Y coordinates, the stroke start indication, and the stroke style are stored in the point list. For all points internal to the stroke, only the X and Y coordinates are necessary.

Figure 3:
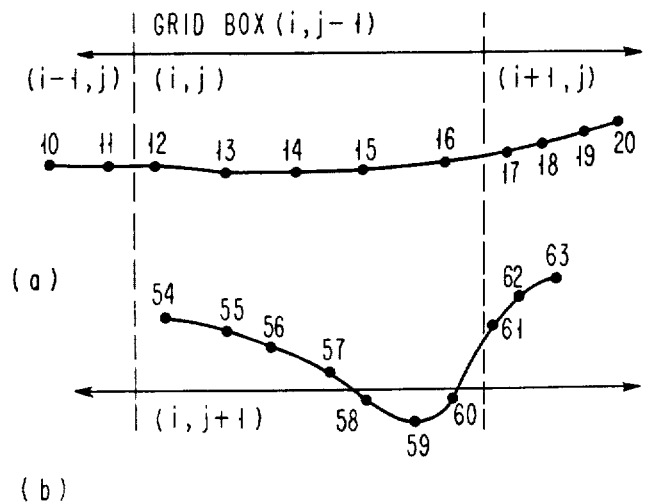
FIG. 3 is a fragmentary view of the digitizer tablet illustrating stroke segments within grid boxes.

To erase the written information, two actions must occur. The HF must update the display to reflect the erasures and give feedback to the user, and modify the point list to match the modified display. In general, the point list can be so large that a linear search for the particular points that form the writing being erased could require more time than the maximum for real-time performance. Real-time erasure can be assured under most circumstances by using a "grid" over the write area to limit the number of points searched to a small percentage of the total. The grid breaks the write area into some number of "grid boxes" as illustrated in FIG. 3. The number and size of the grid boxes varies depending on processing requirements. For example, it might be necessary to require that the grid boxes be large enough so that the largest eraser can cover no more than some fixed number of grid boxes at one time, which might impose some upper limit on the number of points that must be examined for each erase action.

Each stroke in the point list passes through one or more grid boxes. The grid box borders break each stroke into "segments". Generally, each segment is totally contained in a grid box; the exception as illustrated by segment (60,61) occurs when a grid box contains the line between two points but neither of the points defines the line. Each grid box may contain one or more segments from one or more strokes. The HF maintains the segment information in a "grid table". For each grid box, the grid table records the number of segments in the grid box and the starting and ending indices in the point list for each segment contained in that grid box. A partial grid table for FIG. 3 is shown below:

| grid box no. | segs. in box | segment (start, end) |
| --- | --- | --- |
| (i − 1,j) | 1 | (10,11) |
| (i,j) | 3 | (12,16); (54,57); (60,61) |
| (i + 1,j) | 2 | (17,20); (61,63) |
| . | . | |
| . | . | |
| (i,j + 1) | 1 | (58,60) |

As the user writes, the HF puts each point in the point list and determines to which segment the point belongs and updates the grid table accordingly. When the user starts an erase operation, the erase cursor shows what writing is erased when the stylus is down. Only the segments and points in the grid boxes touched by the erase cursor need be searched for erasure. When a point is inside the erase cursor, it might be deleted from the point list. By setting an "inactive" flag in each point, it is not necessary to remove the point from the point list during the erase; it is only necessary to set the flag. Points with the inactive flag set are ignored during any subsequent erasing or drawing. It is possible to erase only the starting point of a stroke, leaving the rest intact. When this happens, the next point of the stroke becomes the start of the stroke; therefore, it is convenient to put the stroke start flag and style in each point of the point list, so the format of the points in the point list is as follows:

| Stroke Start Flag | Inactive Flag | Style | X | Y |
|---|---|---|---|---|

In the description which follows, high level programs for the operating system interface, menu support, write support, and erase support are presented. These high level programs are written following a procedure similar to what is known as Program Design Language (PDL). For a detailed description of that procedure, see Van Leer, "Top Down Development Using a Program Design Language (PDL)", *IBM Systems Journal,* vol. 15, no. 2, pp. 155 to 170 (1976). The handwriting facility interface to the operating system is as follows:

```
Cas OS command of
initialize, redisplay:
If initialize
Then
Initialize the scroll offset to (0,0)
Endif
Calculate where to draw the HF window
Draw the HF write area and menu area frames
Display the stylus style and eraser size
icons in the menu area
Draw the handwriting in the write area
scroll:
Calculate the new scroll offset
Draw the handwriting in the write area
stylus:
Repeat
If point in menu area
Then
Menu support
Else
If current mode is write
Then
Write support
Else
Erase support
Endif
Endif
Until point not in HF window
Endcase
```

The erase icons as well as the stylus style icons must be displayed on initialize and redisplay. The display of already existing handwriting must ignore any inactive points. For the stylus command, the HF must maintain the "current mode" and use it to decide whether to do writing or erasing when the user's stylus is in the write area.

Menu support must change the current mode according to the icon hit. If the current mode changes from erase to write, then any inactive points must be purged from the point list and the grid table updated to reduce processing requirements and storage requirements for further writing or erasing. The menu support is as follows:

```
Repeat
If point in menu area
Then
Draw cursor at point
If an icon hit
Then
If an erase icon hit
Then
Decode desired erase size
Save eraser size
```

```
-continued
Current mode = erase
Else (a write icon hit)
Decode new stylus style
Save new stylus style
If current mode = erase
Then
Remove inactive points
from point list
Reform grid table
Current mode = write
Endif
Endif
Endif
Endif
Get a point from the tablet
Until point not in menu area
```

Write support involves putting a point in the point list and updating the grid table. Occassionally a line between two points will pass through one or more grid boxes not containing either of the two points defining that line. An erasure may require knowledge of these situations, so the HF finds these grid boxes and creates a segment in each such grid box to identify them as, for example, segment (60,61) in FIG. 3. The write support is as follows:

```
Point count = point count + 1
If stylus status changed from up to down
Then
Set stroke start flag
Endif
Set stylus style, X and Y, and store in point list
Find the new grid box containing the point
If stroke start flag set
Then (a new stroke started in the grid box)
Increment segment count for new grid box in
grid table
Put current point count in segment start and
stop indices in new grid box entry of
grid table
Else (a stroke continues)
If new grid box not equal to old grid box
Then (new segment started)
Increment segment count for new grid box
in grid table
Put current point count in segment start
and stop indices in new grid box
entry of grid table
If the line between this point and the
last point passes through any grid
boxes not containing either point
Then
Find all such grid boxes
For each of these grid boxes do
Increment segment count for
new grid box in grid
table
Put the last point count in
start index and the
current point count in
the stop index of the
grid box
Enddo
Endif
Endif
Put current point count in stop index in new
grid box
Endif
Last grid box = new grid box
```

Figure 4:
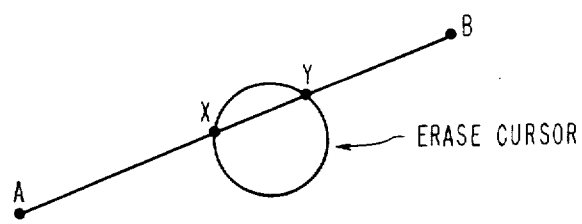
FIG. 4 is a diagram illustrating a line with an erase cursor over it.

Erase support is very similar to write support. Instead of adding points to the point list and the grid table, however, it uses the grid table to determine the points (and/or lines) contained in the erase cursor that must be examined to determine how to modify the point list and display. During the examination of the erasure candidates, the HF can modify the point list and display in various ways to satisfy speed and appearance requirements. A very simple and fast method of erasure simply detects points inside the erase cursor and inactivates them and erases from the display any lines which those points help form. This method works well assuming points are close together so that the appearance of the erased result is acceptable. A more complicated method which results in a better appearance and handles situations where points are farther apart erases from the display only those parts of lines, and any points, inside the erase cursor. For this method, the HF must not only inactivate points, but add points to the point list to make the image defined by the list match the display. In FIG. 4, using the first method, no lines would be erased and no points inactivated. Using the second method, line AB must be erased and lines XA and BY kept; points A and B must be added to the point list so that lines XA and BY are included in the image defined by the point list. The erase support is as follows:

```
Repeat
   If point outside write area
   Then
      leave = true
   Else
      Draw erase cursor of proper size at
      point
      If the stylus is down
      Then
         Map new point to page coordinates
         considering scroll offset
         Find grid boxes touched by the
         current erase cursor
         Create a list of segments,
         contained in these grid boxes,
         that must be searched for
         erasure
         Examine the points designated by
         the segments and inactivate
         the appropriate points in the
         point list and erase the
         correct lines from the display
      Endif
   Endif
   Get a new point from the tablet
Until leave true
```

Figure 5:
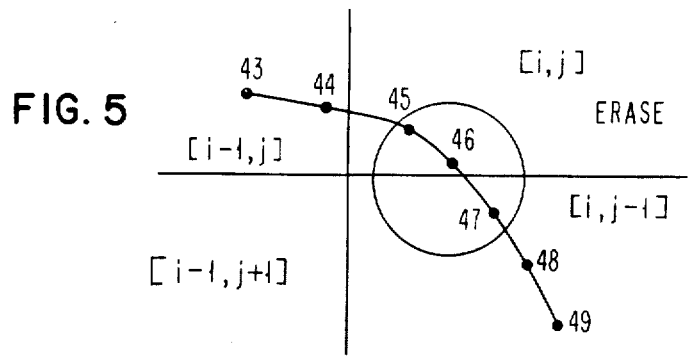
FIG. 5 is a diagram illustrating an erase cursor covering parts of two grid boxes.
Figure 6A:
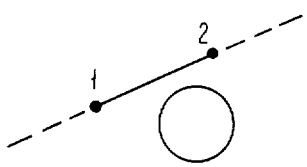
FIGS. 6a to 6f show several possible spatial relationships between the erase cursor and a vector of a segment.
Figures 6B, 6C:
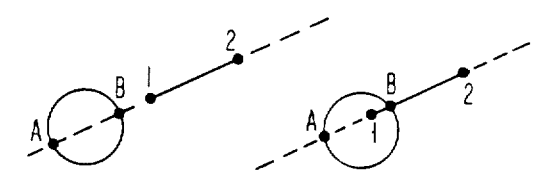
Figure 6D:
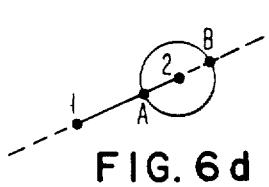
Figure 6E:
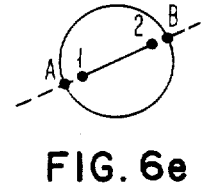
Figure 6F:
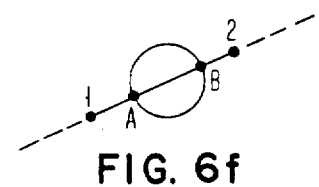

Implementation of a more sophisticated algorithm for real-time rub-out erase that ensures "what you see is what you get" requires some additional terminology and additional processing. In FIG. 5, the erase cursor covers parts of two grid boxes. The stroke formed by points 43, 49 is partially covered by the eraser cursor, and so must be partially erased. The segments generated for the stroke are shown in the figure. To ensure proper processing of the segments of the stroke, the various segments in the grid boxes must first be made contiguous. Again, the results are shown in the figure. If the contiguous segment (45, 49) were processed, note that because point 44 is not included, the results of erasure would not be correct; therefore, the contiguous segment must be made "proper" before processing by adding point 44. There are similar conditions for the ending of a proper segment. Generally, a segment is proper if it starts with a point that is the start of a stroke or is guaranteed to be outside of the erase area and stops with a point that is the end of a stroke or is guaranteed to be outside of the erase area. Processing of proper segments can be complete and correct.

Once the proper segments for a particular erase cursor location are found, several possible cases arise for the spatial relationship between the erase cursor and each vector in the segment as illustrated in FIGS. 6a to 6f. In some cases, it is required that segments be added to the point list as exemplified by FIG. 6f. These "extra segments" are added to the end of the point list and processed separately.

In order to speed up the processing of each erase cursor position, one may recognize that in many cases, the erase cursor will not move enough to cover a different set of grid boxes. If this is true, then the proper segment list for the current erase cursor position is the same as that for the previous erase cursor position, and no recalculation of the contiguous segments and then proper segments is required.

Given the foregoing, the enhanced erase support is as follows:

```
Repeat
   If point outside write area
   Then
      LEAVE = true
   Else
      Draw erase cursor of proper size at point
      If the stylus is down
      Then
         Process extra segments (if any) at end
         of point list
         SAME = true
         Map new point to page coordinates
         considering scroll offset
         Find grid boxes touched by current erase
         cursor
         If number of grid boxes > = number of
         grid boxes for previous erase
         cursor
         Then
            SAME = false
         Else
            For n = 1 to number of grid boxes
            do
               If grid box(n) > = old grid
               box(n)
               Then
                  SAME = false
               Endif
               If not SAME then exit
            Endfor
         Endif
         If not SAME
         Then
            Find contiguous segments
            Make contiguous segments proper
            Save number of and list of grid
            boxes
         Endif
         Process proper segments for erasure
      Endif
   Endif
   Get a new point from the tablet
Until LEAVE = true
```

Figure 7:
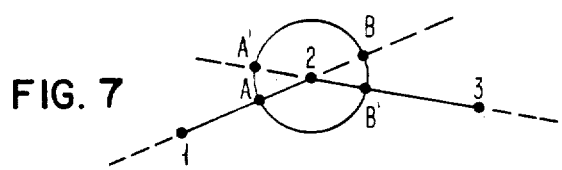
FIG. 7 illustrates the process of making a point inactive and deleting it from the point list.

As may be seen in FIG. 7, when processing the vector 1-2 of the segment (1, 3), point 2 is made inactive and essentially deleted from the point list. To take advantage of this deletion and to prevent the vector 1-A from being added to the extra segment list, the point A is substituted for point 2. This creates a problem when vector 2-3 is processed. To avoid this problem, point 2 is saved for processing with vector 2-3 and the flag SAVED is set. Before the vector 2-3 is processed, SAVED must be checked to ensure that the correct point (2 in this case instead of A) is processed. A similar problem arises from case illustrated in FIG. 6e. When the second of the two points is made inactive, the flag SET2IN is set to note the situation.

The method for processing the extra segments placed at the end of the point list is as follows. This processing can be special cased because no extra segment ever contains more than two points (one vector). The following terminology is used:

```
• 1 - first point in the segment (vector)
• 2 - second point in the segment (vector)
• SOS - start of stroke indication
  For i = 1 to number of extra segments (vectors) at end
  of point list do
  If point 1 active and point 2 not SOS
  Then
    Process the vector 1-2
  Endif
  Endfor
  For a proper segment, the processing is as follows.
The following terminology is used:
• point i - a general point for the processing loop
• saved point - a point saved under conditions described
  above
• SAVED - see description above
• SET2IN - see description above
• S - the first real point in the vector (see the above
  description
• SOS - start of stroke indication
• active/inactive - indication of whether the point is
  considered in the point list
  For i = segment begin to (segment end - 1) do
  If (point(i) active or (point(i) inactive and
  SET1IN)
  Then
    If (point(i+1) active) and (not SOS)
    Then
      Clear SET2IN
      If SAVED then S = saved point else
      S = point i
      Process vector S−(i+1)
    Else
      If point(i+1) inactive the skip
      point (i+1)
    Endif
  Endif
  Endfor
```

The following method must be used to process each individual vector. The terminology used is as follows (refer to FIGS. 6a to 6f):

```
• 1 - the first point of the vector in process
• 2 - the second point of the vector in process
• A - the first intersection of the erase cursor with the
  line corresponding to the vector
• B - the second intersection of the erase cursor with
  the line corresponding to the vector
• SOS - start of stroke
```

The details of vector processing are as follows:

```
Find intersections of line 1-2 and erase cursor
If two intersections
Then
  If (1 between A-B) or 2 between A-B)
  Then [case 6c, 6d or 6e]
    If 1 between A-B
    Then
      If 2 between A-B
      Then [case 6e]
        Erase 1-2; make 2 inactive; set
        SET2IN
        If SAVED then clear SAVED else
        make 1 inactive
      Else [case 6c]
        Erase 1-B
```

```
        If SAVED
        Then
          Make 2 SOS; add B-2 to point
          list; clear SAVED
        Else
          Substitute B for 1 in point
          list; make B SOS
        Endif
      Endif
    Else [case 6d]
      Erase A-2; save 2; set SAVED
      Substitute A for 2 in point list
    Endif
  Else [check for case 6f]
    If A between 1-2
    Then [case 6f]
      Erase A-B; make 2 SOS; add 1-A, B-2 to
      point list
      Clear SAVED
    Endif
  Endif
Endif
```

When the user leaves the erase mode, the extra segments at the end of the point list are processed to include them in the grid table. The method for doing this is so similar for the initial entry of points that it is not repeated.

From the foregoing description of the invention, it will be appreciated that the inclusion of a real-time erase capability in the electronic handwriting facility makes the facility more flexible and more usable. The use of an overlying grid allows erasure to take place in real time and supports many methods of erasure.

Having thus described my invention, what I believe to be novel and wish to secure by Letters Patent is:

1. In an electronic handwriting facility comprising a central processor unit, an all points addressable display, and an electronic tablet and stylus, said handwriting facility simulating writing with a pen or pencil and paper and generating an electronic document by periodically sending to the central processing unit the absolute location of the stylus in relation to the tablet, mapping each location point to the display coordinate system, and storing the points in a point list, the improvement comprising a real-time rub-out erase feature for the handwriting facility comprising the steps of establishing a grid over the write area on the tablet to delineate the write area into a plurality of grid boxes, storing in a grid table the starting and ending points of line segments within each of said grid boxes, said grid table being updated whenever a point is added to said point list, setting the system to erase mode and displaying an erase cursor on said display showing the relative location of said stylus to the electronic tablet, searching only the segments and points in the grid boxes touched by the erase cursor during erasure, updating said point list and said grid table after erasure, and updating said display to provide a real-time display of the erasure.

2. The real-time rub-out erase feature as recited in claim 1 further comprising the step of selecting the size of the erase cursor.

3. The real-time rub-out erase feature as recited in claim 2 wherein the step of selecting the erase cursor size comprises the steps of displaying a menu of erase stylus size icons on said display, and detecting the touching of an erase stylus size icon by the erase cursor.

4. The real-time rub-out erase feature as recited in claim 1 wherein the step of updating said point list comprises deleting any point in the display within the erase cursor.

5. The real-time rub-out erase features as recited in claim 4 wherein the step of deleting is performed by setting an inactive flag in the point list.

6. The real-time rub-out erase feature as recited in claim 4 wherein, when only a portion of a line segment is within said erase cursor, the step of updating said point list further includes the step of adding to the point list points on the line segment at the intersection with the erase cursor.

7. The real-time rub-out erase feature as recited in claim 4 further comprising the step of selecting the size of the erase stylus and wherein the step of displaying an erase cursor produces a cursor display having a size corresponding to the selected erase stylus size.

8. The real-time rub-out erase feature as recited in claim 7 wherein the step of selecting the erase stylus size comprises the steps of displaying a menu of erase stylus size icons, and detecting the touching of an erase stylus size icon by the erase cursor.

* * * * *